United States Patent [19]

Buonaura et al.

[11] Patent Number: 5,393,808
[45] Date of Patent: Feb. 28, 1995

[54] COMPOSITION OF MATTER FOR WEAR SURFACES AND METHOD FOR PRODUCING SAME

[75] Inventors: Anthony Buonaura, Bluford, Ill.; John W. Moore, Creve Coeur, Mo.

[73] Assignee: The Swan Corporation, St. Louis, Mo.

[21] Appl. No.: 257,465

[22] Filed: Jun. 9, 1994

Related U.S. Application Data

[63] Continuation of Ser. No. 150,352, Nov. 10, 1993, abandoned, which is a continuation of Ser. No. 107,979, Feb. 12, 1993, abandoned, which is a continuation of Ser. No. 614,673, Nov. 15, 1990, abandoned, which is a continuation of Ser. No. 405,406, Sep. 11, 1989, abandoned, which is a continuation of Ser. No. 192,222, Oct. 16, 1987, abandoned.

[51] Int. Cl.⁶ .............................................. C08L 67/00
[52] U.S. Cl. .................... 523/514; 523/523; 523/526; 524/401; 524/433; 524/491; 524/437; 524/301; 524/307
[58] Field of Search ............. 523/514, 523, 526; 524/401, 433, 491, 301, 307, 437

[56] References Cited

U.S. PATENT DOCUMENTS

| | | | |
|---|---|---|---|
| 3,432,458 | 10/1967 | Kwan et al. | 523/514 |
| 3,772,241 | 11/1973 | Kroekel | 523/523 |
| 4,160,758 | 7/1979 | Gardner et al. | 523/523 |
| 4,173,561 | 11/1979 | Tabana et al. | 524/433 |
| 4,687,802 | 8/1987 | Hepp | 524/433 |

Primary Examiner—John C. Bleutge
Assistant Examiner—Mark D. Sweet
Attorney, Agent, or Firm—Kalish & Gilster

[57] ABSTRACT

A composition of matter especially for the formation and development of wear surfaces of decorative or aesthetic character is provided which comprehends a matrix and discrete reforcing elements embedded in the matrix. The matrix is resin-based with the resin being hydrogenated bis-phenol A which is mixed with a suitable low profile additive, a catalystic agent, a flame retardant, an extender, and a inhibitor while the reinforcer is constituted of glass fiber particles. The method for preparing such composition comprises the intermixture of the matrix ingredients into a blend having a viscosity with the range of approximately 60,000 to approximately 100,000 centipois; to such blended mixture there is then added a viscosity increasing agent but with the glass fibers being introduced prior to the interreaction of the viscosity increasing agent; agitation being provided to bring about appropriate intermixture of the glass fibers and with such mixture being stored for a sufficient period at a predetermined temperature to permit the viscosity increasing agent to bring about a high level of viscosity. The then partial cure is now in condition for final cure through the particular compression mold process for creation of the intended article to be produced.

11 Claims, No Drawings

COMPOSITION OF MATTER FOR WEAR SURFACES AND METHOD FOR PRODUCING SAME

This application is a continuation of application Ser. No. 08/150,352, filed Nov. 10, 1993, now abandoned; which is a continuation of application Ser. No. 08/107,979, filed Feb. 12, 1993, abandoned; which is a continuation of application Ser. No. 07/614,673, filed Nov. 15, 1990, abandoned; which is a continuation of application Ser. No. 07/405,406, filed Sep. 11, 1989, abandoned; which is a continuation of application Ser. No. 07/192,222, filed Oct. 16, 1987, abandoned.

BACKGROUND OF THE INVENTION

1. Field of the Invention

This invention relates, in general, to compositions of matter and, more particularly, to such compositions as are suitable for cosmetic wear surfaces.

2. Description of the Prior Art

Heretofore there have been numerous efforts to develop materials for accommodating the ongoing need for wear surfaces which are intended primarily for decorative purposes, such as, for example, kitchen and bathroom fixtures, wall coverings, tops for both furniture and display fixtures, and the like. These current compositions have been of various characters; one well known type being high pressure laminates which, understandably, comprehend a multiplicity of layers of wood, fiber board, or the like. However, such have recognized disadvantages in that if any damage is effected to the surface, the component cannot be artistically repaired and is subject to replacement. Additionally, the durability of these laminates is limited to certain conditions which may tend to cause this product to delaminate, that is bring about a parting of the laminae and the substrate.

Another composition consists of cultured marble which includes a thin outer surface finish, as of polyester which cannot withstand long term wear, scratches, thermo-shock, cuts, abrasions, and the like. Thus, after a limited period of use such material may readily lose its attractiveness and require replacement since repair is impossible. Cultured marble also readily shatters upon any sudden impact and is subject to stress.

Another category of compositions which has been widely used, but with accepted deficiencies, is the ceramics. Such are recognizedly most fragile and unable to withstand but minimal impact as might be received during ordinary usage with consequent shattering. The impossibility of restoring cracked ceramic to its original state is, of course, understood so that the user must accept the unsightliness caused by such cracking or undertake the substantial expense of replacing the particular article.

In this last mentioned category, there would be included the types wherein porcelainized steel and cast iron provide a substrate for the ceramic coating. Such material is also subject to chipping, cracking, and the like with the same impossibility of repair as in an article comprising ceramic alone.

The compositions heretofore utilized for primarily decorative wear surfaces have had various inherent defects which users have had to reluctantly observe.

SUMMARY OF THE INVENTION

It is an object of the present invention to provide a composition of material which is especially adapted for utilization as a wear surface, particularly wherein high visibility is present so that the same will consistently provide a pleasing and attractive appearance.

It is another object of the present invention to provide a composition of the character stated which is homogeneous in character and resistant to decomposition; and which provides a strong, durable, monolithic body impervious throughout the thickness thereof.

It is a further object of the present invention to provide a composition of the character stated which is resistant to permanent surface damage as might be occasioned by abrasion-producing instrumentalities, cigarette burns, stains as effected by agents accidentally applied thereon, or environmental conditions. Any surface marring that might be occasioned can be easily and simply repaired by the user so that the replacement or costly repair by a skilled artisan is obviated.

It is a still further object of the present invention to provide a composition of the character stated which is not subject to stress; and which is resistant to thermo-cracking as well as surface peeling.

It is another object of the present invention to provide a composition of the character stated which being of integral character does not require any surface coating by an extrinsic agent; which is readily moldable to provide an article of predetermined configuration dependent entirely upon the intended usage; articles of which have wide application in both residential and industrial usage; which may be produced in a competitive manner with any other composition for like purposes; and which articles have marked longevity of use.

It is still another object of the present invention to provide a method for producing the composition of matter embodying the present invention which method may be easily performed.

DETAILED DESCRIPTION OF THE INVENTION

The present invention contemplates the production of a composition of matter which is adapted for the manufacture of wear sufaces such as utilized both in residences as well as industrial establishments including, for example only, tops for furniture and display fixtures; wall coverings; bathroom, kitchen, and laboratory fixtures; ad infinitum.

The composition of this invention comprises two essential components one being the matrix and the other being the reinforcer. The matrix is constituted of various constituents to be discussed hereinbelow which are intermixed, under ambient conditions, to bring about a resultant viscous material into which the reinforcer is fed and then intermixed to bring about the resultant compound. The character of the matrix is dictated by the inclusion therein of hydrogenated bis-phenol A which has been treated in accordance with accepted pratice to provide a linear polyester prepolymer.

The selected resin serves certain critical functions, namely to assure of the ultimate finish any article constructed of the composition of this invention as well as to bond the various ingredients of the matrix in a reliable cohesive manner and promote integration of the reinforcer.

A second ingredient of the matrix may be referred to as a low profile additive which provides molding characteristics and properties of any final product embodying the present composition, including especially, surface smoothness, and resistance to surface and linear shrinkage. Addititives which have been found especially suitable include acrylic modified polyvinyl acetate in styrene solution; and low density polystyrene pellets in styrene solution.

Also included within the matrix is a catalyst for inducing curing, as discussed hereinbelow, which is adapted to decompose to generate reactive free radicals at a controlled rate to elevate temperatures. Agents having the desired characteristics are the organic peroxides, such as t-butyl, perbenzoate, and t-amyl perbenzoate. It is understood that the latter are simply exemplary.

Another ingredient of the matrix is an inhibitor used primarily to enhance storage stability in the composition and to prevent premature gelation during processing and molding operations. Particularly suitable as inhibitors are various quinones, among which are hydroquinone; mono-tertiary butyl hydroquinone; and para-benzoquinone. Although these agents could be provided in liquid form, it has been found perferable to utilize same as powders.

A further component of the matrix is a mold release agent for the manifest purpose of preventing any article molded from the composition from adhering to the mold as well as facilitating its removal without damage. Well known mold release agents may be utilized but calcium stearate and zinc stearate have been found to be highly efficacious.

There is also included in the matrix a flame retardant agent recognizedly for the purpose of hindering ignition or flame spread. An agent providing this desired property is alumina trihydrate.

The remaining basic constituent of the matrix is a so-called extender which is provided to improve flowability, raise modulus, and impart an istropic nature to the composition. Extenders for the present matrix constitute primarily the glass powders.

The following would is a general formulation for a matrix to be produced in accordance with the present invention:

| Ingredient | Parts By Weight |
| --- | --- |
| Resin | Approx. 70 to Approx. 90 |
| Low Profile Additive | Approx. 10 to Approx. 35 |
| Catalyst | Approx. 1 to Approx. 1.5 |
| Inhibitor | 1000 ppm |
| Mold Release Agent | Approx. 5 to Approx. 7 |
| Flame Retardant Agent | Approx. 100 to Approx. 150 |
| Extender | Approx. 50 to Approx. 90 |

Examples of compositions embodying the general formulation above set forth are as follows:

EXAMPLE I

| Ingredient | Parts By Weight |
| --- | --- |
| Hydrogenated bis-phenol A | 75 |
| Acrylic modified polyvinyl acetate in styrene solution | 25 |
| T-butyl perbenzoate | 1.25 |
| Hydroquinone | 1000 ppm |
| Calcium stearate | 6 |
| Alumina trihydrate | 125 |
| Solid glass powder | 70 |

EXAMPLE II

| Ingredient | Parts By Weight |
| --- | --- |
| Hydrogenated bis-phenol A | 65 |
| Low density polystyrene pellets in styrene solution | 35 |
| T-amyl perbenzoate | 1.0 |
| Mono-tertiary butyl hydroquinone | 1000 ppm |
| Zinc stearate | 5 |
| Alumina trihydrate | 140 |
| Solid Glass Powder | 80 |

The specific examples hereinabove set forth must necessarily be considered merely for purposes of demonstrating the myriad combinations of ingredients selected from those discussed hereinabove for developing a matrix having the requisite qualities and characteristics. It would not be constructive to set forth additional examples as the same would but comprehend components identified to hereinabove and in such proportions as would fall within the related ranges indicated in the general formulation presented. Experimentation has demonstrated the efficacy of all such potential combinations so that it would serve no purpose to fill this disclosure with innumerable formulations all of which anyone having ordinary skill in the art could easily contrive from the data set forth hereinabove.

The relative amounts of the various constituents are most sensitive being carefully delineated in order that the matrix will have the requisite viscosity. The purpose of which will become more evident hereinbelow.

A matrix incorporating a formulation according to that set forth will have a viscosity within the range of approximately 60,000 to approximately 100,000 centipois.

In order to prepare a matrix having the compositon described the various ingredients are introduced into a suitable vessel, under room conditions, and subjected to a vigorous mixing action as may be accomplished by utilization of a high shear mixer. In actual practice the resin is introduced into the vessel and thereupon the agitatormixer is energized. Then the various remaining ingredients are sequentially introduced in the order set forth in the general formulation above. For reasons of economy in production, batches approximating 2800 pounds are developed although any preselected amount could be utilized. With a batch of 2800 pounds, the adding and mixing action would consume a time spand of about 25 to 35 minutes as the ingredients are introduced slowly so that an even blend may be achieved. After the last ingredient has been added, the agitation is continued for roughly 3 or 4 minutes for assured intermixture. It is important that during the mixing process the heat not exceed a temperature of 90° F. Should the temperature rise above that point the mixing action will be stopped and the blending discontinued until the temperature has descended below the 90° F. level whereupon agitation may be resumed.

Upon termination of the blending the agitator is deenergizeded and the mixture in the vessel is allowed to cool to 77° F. at which temperature measurements are taken to make certain that the viscosity of the blended material is in the aforesaid critical range of approximately 60,000 to 100,000 approximately centipois. If so, the matrix is now fully developed.

It is to be observed, that a matrix formulated in accordance with a the foregoing would be colorless. It is understood, however, that in actual usage of any composition of the present invention the same would, in all likelihood, bear a predetermined color depending upon the ultimate purpose of the articles to be formed therefrom. Color agents such as inorganic or organic powdered components may be added to the mixture during subjection of the same to the high shearing, mixing action. Such color agents would be within the range of approximately 2 to approximately 8 parts by weight depending upon the particular shade desired. The color agent is manifestly added for aesthetic purposes and does not in any way conduce to the unusual properties of the composition of this invention.

The matrix is now in condition for accepting the other primary ingredient of the composition of this invention, namely the reinforcer.

However, immediately preceding introduction of the reinforcer a viscosity increasing agent is added to the developed matrix under ambient conditions. This newly added agent will, in due course, serve to enhance the viscosity of the ultimate composition for the purpose of promoting an intimate integration of the reinforcer within the matrix; actually interlocking the same to promote the basic physical characteristics of the article to be molded therefrom. Viscosity increasing agents found particularly useful with the present composition are magnesium oxide, magnesium hydroxide, calcium oxide, and calcium hydroxide, which are in the related quantities within the range of approximately 1 to approximately 3 parts by weight.

It is believed that this agent actually inter-reacts with the resin causing salt formation between acid end groups to form a molecular weight pseudo or reversible polymer. Such agents do not commence to react over a time interval of approximately 30 to approximately 45 minutes which period, as will be discussed below, permits integration with the reinforcer before any viscosity increasing action occurs so that the reinforcer may be optimally saturated.

The reinforcer is an agent critical to the present composition for providing the inherent strength thereof and bringing about the integration of the components. Additionally, the reinforcer provides certain crucial functions prior to the completion of molding of any articles from the composition and also induces flowability within the mold, thereby assuring of effective and reliable molding operations. Also, the reinforcer does tend to prevent shrinkage of the resultant article.

The reinforcer constitutes glass fiber which is within the range of soft to medium as such terms are recognized in industry. Such characterization indicates the degree of solubility of the fiber in styrene so that for example, a highly soluble fiber would be classified as "soft". The terms "soft" "medium" and "hard" are, as stated, widely used and fully understood within this field. The glass fiber is suitably chopped or otherwise comminuted to provide particles having a length within the range of approximately $\frac{1}{8}$ inch to approximately 1 inch. The thickness of such particles is obviously determined by the strand or strands from which the same are cut and for ease of production roving bundles of strands are used. Such bundles contain on average about 62 strands per roving end. The term "roving", for clarification, is to be understood as the same is used in the match metal dye compression molding process.

The glass fiber constitutes approximately 7 to approximately 15 percent by weight of the ultimate composition with the balance being the matrix. In order to make certain that the appropriate amount of reinforcer is added, the blended matrix is weighed so that a determination may be made as to the poundage of glass fibers to be added. It is thus apparent that in the fully formed composition the matrix will consitute between approximately 85 to approximately 93 percent of the composition while the balance, being the glass fibers, will constitute approximately 7 to approximately 15 percent. Since the reinforcer provides strength to the ultimate composition, the amount will be determined by the desired characteristics of the article to be formed. Generally with an article of relative thinness, a greater amount of glass fiber will be required than in an article of relatively increased thickness. In the latter instance, it will be apparent that the composition would be substantially constituted of the matrix and therefrom possess requisite strength whereas with a thinner article, hence with less matrix, a relative greater quantity of the glass fiber would be required. As an example, with a counter top of $\frac{1}{2}$ inch thickness, 10 to 12 percent by weight of the reinforcer would be adequate to endow the article with the various properties provided by the composition whereas an article having a thickness in the range of $\frac{1}{8}$ inch, such as a wall covering, the greater the amount, namely approximately 20 percent by weight of the reinforcer, would be used.

In order to introduce the glass fiber particles into the matrix, various types of well known equipment could be utilized but the essential object is to cause the matrix to be in a state of flow or agitation while the glass fiber particles are being metered thereinto.

It is desirable that the intermixture be promoted by suitable equipment, such as flow between impregnating rolls or subjection to a bulk mixer or the like to assure that the glass fiber particles are well accepted within the matrix. With the integration of the glass fibers, formation of the present composition has been substantially completed so that the subsequent procedures much refine and complete the intimate union of the components of the composition which now embodies the glass fiber.

The composition, or now glass fiber impregnated matrix, which is still within at the orignal viscosity, namely approximately 60,000 to approximately 100,000 centipois, is then discharged in predetermined quantities dictated by handling capabilities for enclosure within a suitable air-tight, solvent-resistant flexible casing which may be of general bag-like character, and formed as of polyethylene film, for example only. Such casing is wrapped tightly about the composition in its then current condition, and, as pointed out, resists reaction with the solvents within the composition and provides a vehicle for handling the composition during the pre- or partial curing stage. Such encased volumes of the compostion are then placed within a closed space, such as a vault-like room which provided an environment having certain predetermined conditions amenable to partial curing operations. Such enclosures must be maintained at a constant predetermined temperature. The selection of the temperature varies directly with the speed of the partial curing. At a temperature as in the 30° F. or below the partial curing would be markedly slower than within the desired range of 70° to 90° F. Above 90° the composition may tend to cause decompositon, as with solvent flashing and the like so that the resultant partially cured composition would not possess the properties which would be obtained within the aforesaid desirable range. The preferrable temperature would be around 70° F. and at such the partial curing would take, roughly a day and a half, whereas at 90° F., for example, the partial cure would be more rapid and hence might only require a single day. It should be understood that during this period wherein the partial cure is being effected the viscosity increasing agent is taking effect and thus bringing about the thickening of the composition so that during the period of partial cure the viscosity is climbing from the original range of approximately 60,000 to approximately 100,000 to literally millions centipois. The viscosity is being tested periodically during the partial cure stage so that the desired character of the material is attained with the preselected ultimate viscosity. The thus partially cured composition is then withdrawn from the controlled environment, and the same is now in condition for subjection for molding to the final article of manufacture. At this stage the partially cured material is in a pliable, leathery form, being dry to the touch, so that it can be readily handled, weighed, cut into portions or discrete masses of preselected size and weights suitable for charging to the mold, as of compression type.

The partially cured composition is then introduced into a preselected compression mold for forming. Therein the temperature range is within approximately 270° to approximately 315° F. and the pressure is within a range of approximately 100 to approximately 500 psi. Manifestly, the applied pressure will be greatly determined by the ultimate shape, size, and thickness of the article being formed. It should be recognized that with the present compositon, the pressure range is relatively broad so that the molder is not restricted as in the molding of comparable materials. With the latter the ranges are exceedingly narrow as within 100°, so that close control must be maintained. With the composition of the present invention, a considerably broader range is available which facilitates the molding operation without diminution in the quality of the article.

The molding procedure thus follows established pressure molding techniques to provide the ultimate article. As indicated above, the present composition consists essentially of the particular matrix and above described reinforcer to possessa multiplicity of physical properties which have not heretofore been associated with a single compositon for wear surface possesses. Thus, in an article formed from the present composition is relatively resistant to abrasion, but in the event any surface marring, scuffing, or damage were effected as through scratching, cutting, gouging, and the like, the article may be immediately restored to original condition by an unskilled individual utilizing a suitable abrasive agent, such as sand paper, emery paper, and the like. This capability may not be resorted to with current wear surface compositions for such purposes.

It is to be noted that the composition is homogeneous so that there is no applied surface coating which is common with presently available compostions. Consequently, any blemishing of the surface that might be caused, conceivably through stains, burns, or the like, may be easily removed, with return to original condition, without lose of aesthetic appeal as through the primary utilization of abrasives or common household cleaning agents and, in many instances, simply a wet sponge. With cigarette burns, a wet sponge has proved to be quite adequate for eradication.

In addition to the foregoing capacity to be maintained in a substantially pristine condition, the strength of the article formed is substantially greater than that of compostions heretofore utilized for like purposes so as to be capable of withstanding thermo-cracking, chipping, breaking, fracture, all of which do not have the same effect as such are experienced with other compositions such as cultured marble, ceramics, whether with or without substrates, laminates or the like.

In view of the fact that the present invention does not require any surface coating, there is, of course, no surface peeling, which isan acknowledged detriment or detraction with known compostions.

There is no limitation as to the range of color or shading which may be accorded an article formed from the present compostion since the same is readily adapted for receiving any well known pigment whereby the compositon is productive of extremely aesthetic articles.

What is claimed:

1. A method for producing a moldable composition of matter comprising developing a reinforced matrix under ambient conditions, which matrix consists of a hydrogenated bis-phenol A linear polyester prepolymer, a low profile additive, a catalytic agent, an inhibitor, a mold release agent, a flame retardant, an extender, and a viscosity increasing agent; wherein a predetermined quantity of the hydrogenated bis-phenol A linear polyester prepolymer is charged to a vessel, then subjecting same to agitation and during such agitation to sequentially introduce into the vessel a low profile additive, a catalytic agent, an inhibitor, a mold release agent, a flame retardant, and an extender, continuing the agitation until the ingredients are blended, then adding a viscosity increasing agent, and prior to inter-reaction of the viscosity increasing agent to introduce into the blended material under agitation a predetermined quantity of solid reinforcing elements, then, subsequent to intermixture of the reinforcing elements within the blended material to withdraw the mixture and to store same for a predetermined period of time requisite for permitting the viscosity increasing agent to enhance the viscosity of the mixture, and then while the mixture is in a pliable, leathery-like, dry to the touch state for subjection to ultimate compression.

2. A method a defined in claim 1 wherein the mixture is stored within an environment having a temperature within the range of approximately 70° to approximately 90° F.

3. A method as defined in claim 1 wherein during storage viscosity measurements are periodically made of the mixture and when the same reaches a predetermined level to withdraw the same from storage.

4. A method as defined in claim 1 wherein the low profile additive is from the class consisting of acrylic modified polyvinyl acetate in styrene solution and low density polystyrene pellets in styrene solution; the catalyst being of the class consisting of t-butyl perbenzoate and t-amyl perbenzoate; the inhibitor being of the class consisting of hydroquinone, mono-tertiary butyl hydorquinone, and para-benzoquinone; the mold release agent being of the class consisting of calcium stearate and zinc stearate; and the flame retardant being alumina trihydrate.

5. A method as defined in claim 3 wherein the viscosity increasing agent is from the class consisting of calcium oxide, calcium hydroxide, magnesium oxide, and magnesium hydroxide.

6. A method as defined in claim 1 wherein the reinforcing elements are solid glass fibers being of a length approximately ⅛ inch to approximately 1 inch.

7. A method as defined in claim 1 wherein the viscosity of the blended material prior to introduction of the viscosity increasing agent is within the range of approximately 60,000 to approximately 100,000 centipois.

8. A method for producing a moldable composition of matter comprising developing a reinforced matrix under ambient conditions, which matrix consists of a hydrogenated bis-phenol A linear polyester prepolymer, a low profile additive, a catalytic agent, an inhibitor, a mold release agent, a flame retardant, an extender, and a viscosity increasing agent; wherein a predetermined quantity of the hydrogenated bis-phenol A linear polyester prepolymer is charged to a vessel, then subjecting same to agitation and during such agitation to sequentially introduce into the vessel a low profile additive, a catalytic agent, an inhibitor, a mold release agent, a flame retardant, and an extender, continuing the agitation until the ingredients are blended, the blended material being within the range of approximately 100,000 centipoise, then adding a viscosity increasing agent, and prior to inter-reaction of the viscosity increasing agent to introduce into the blended material under agitation a predetermined quantity of solid reinforcing elements, comprising glass fibers being within the range of approximately ⅛" to approximately 1" and having a cross-section corresponding to that of a roving bundle, then subsequent to intermixture of the reinforcing elements within the blended material to withdraw the mixture and to store same within an environment having a temperature within the range of approximately 70° F. to approximately 90° F. for a predetermined period of time requisite for permitting the viscosity increasing agent to enhance the viscosity of the mixture, withdrawing the mixture in partially cured condition from the controlled environment, and then while the mixture is in a pliable, leathery-like, dry to the touch state, forming discrete masses of preselected sizes and weights, and then subjecting said masses to molding; the molding temperature being within the range of approximately 270° F. to approximately 325° F. and the pressure being within the range of approximately 100 to approximately 500 psi.

9. A method as defined in claim 8 wherein during storage viscosity measurements are periodically made of the mixture and when the same reaches a predetermined level to withdraw the same from storage.

10. A method as defined in claim 9 wherein the low profile additive is from the class consisting of acrylic modified polyvinyl acetate in styrene solution and low density polystyrene pellets in styrene solution; the catalyst being of the class consisting of t-butyl perbenzoate and t-amyl perbenzoate; the inhibitor being of the class consisting of hydroquinone, mono-tertiary butyl hydroquinone, and para-benzoquinone; the mold release agent being of the class consisting of calcium stearate and zinc stearate, and the flame retardant being alumina trihydrate.

11. A method as defined in claim 10 wherein the viscosity increasing agent is from the class consisting of calcium oxide, calcium hydroxide, magnesium oxide, and magnesium hydroxide.

* * * * *

UNITED STATES PATENT AND TRADEMARK OFFICE
CERTIFICATE OF CORRECTION

PATENT NO. : 5,393,808
DATED      : February 28, 1995
INVENTOR(S): Buonaura et al.

It is certified that error appears in the above-identified patent and that said Letters Patent is hereby corrected as shown below:

In the Claims:

Claim 1: Column 8, line 33, delete "to introduce" and insert
         --introducing--;

line 37, delete "to withdraw" and insert
         --withdrawing-- and delete "to store" and insert
         --storing--;

lines 41 and 42, delete "for subjection" and
         insert --subjecting--.

Claim 3, Column 8, line 50, delete "to withdraw" and insert
         --withdrawing--.

Claim 8, Column 9, line 22, delete "to introduce" and insert
         --introducing--;

line 28, delete "to withdraw" and insert
         --withdrawing--;

line 29, delete "to store" and insert
         --storing--.

Claim 9, Column 10, line 14, delete "to withdraw" and insert
         --withdrawing--.

Signed and Sealed this

Ninth Day of May, 1995

Attest:

BRUCE LEHMAN

Attesting Officer            Commissioner of Patents and Trademarks